US010081149B2

(12) United States Patent
Uozumi et al.

(10) Patent No.: US 10,081,149 B2
(45) Date of Patent: Sep. 25, 2018

(54) STEPPED DIE

(71) Applicant: Sumitomo Electric Sintered Alloy, Ltd., Takahashi-shi (JP)

(72) Inventors: Masato Uozumi, Itami (JP); Shinichi Hirono, Itami (JP)

(73) Assignee: Sumitomo Electric Sintered Alloy, Ltd., Takahashi-shi (JP)

( * ) Notice: Subject to any disclaimer, the term of this patent is extended or adjusted under 35 U.S.C. 154(b) by 268 days.

(21) Appl. No.: 15/119,888

(22) PCT Filed: Oct. 17, 2014

(86) PCT No.: PCT/JP2014/077688
§ 371 (c)(1),
(2) Date: Aug. 18, 2016

(87) PCT Pub. No.: WO2015/145842
PCT Pub. Date: Oct. 1, 2015

(65) Prior Publication Data
US 2017/0050402 A1 Feb. 23, 2017

(30) Foreign Application Priority Data
Mar. 25, 2014 (JP) ................................ 2014-062336

(51) Int. Cl.
*B29C 43/02* (2006.01)
*B22F 3/03* (2006.01)
(Continued)

(52) U.S. Cl.
CPC .............. *B30B 15/022* (2013.01); *B22F 3/03* (2013.01); *B22F 5/106* (2013.01); *B30B 15/02* (2013.01);
(Continued)

(58) Field of Classification Search
CPC ......... B22F 3/03; B22F 3/1208; B30B 15/022
(Continued)

(56) References Cited

U.S. PATENT DOCUMENTS

| | | | |
|---|---|---|---|
| 4,797,326 | A | 1/1989 | Csillag |
| 5,406,825 | A | 4/1995 | Horie et al. |

(Continued)

FOREIGN PATENT DOCUMENTS

| | | | |
|---|---|---|---|
| JP | 61-273231 | A | 12/1986 |
| JP | 2-111661 | | 4/1990 |
| JP | 03-059329 | U | 6/1991 |
| JP | 6-316743 | A | 11/1994 |

(Continued)

OTHER PUBLICATIONS

International Search Report in International Application No. PCT/JP2014/077688, dated Jan. 20, 2015.

*Primary Examiner* — Joseph S Del Sole
*Assistant Examiner* — Thu Khanh T Nguyen
(74) *Attorney, Agent, or Firm* — Venable LLP; Michael A. Sartori; Miguel A. Lopez

(57) ABSTRACT

Provided is a stepped die which includes: an inner ring having a cylindrical shape, and an outer ring having a cylindrical shape which is fitted on an outer periphery of the inner ring by shrinkage fitting, in which a recessed portion for molding which has a stepped portion is formed on an inner side of the inner ring. A shrinkage fitting ratio of the outer ring to the inner ring is set to a value which falls within a range of from 0.12% to 0.25%.

6 Claims, 11 Drawing Sheets

(51) Int. Cl.

| | |
|---|---|
| ***B30B 15/02*** | (2006.01) |
| ***B22F 5/10*** | (2006.01) |
| *B22F 3/02* | (2006.01) |
| *C22C 29/06* | (2006.01) |
| *C22C 29/08* | (2006.01) |
| *C22C 29/10* | (2006.01) |

(52) U.S. Cl.
CPC .............. *B30B 15/026* (2013.01); *B22F 3/02* (2013.01); *C22C 29/06* (2013.01); *C22C 29/08* (2013.01); *C22C 29/10* (2013.01)

(58) Field of Classification Search
USPC ........................................... 425/78, 330, 352
See application file for complete search history.

(56) References Cited

U.S. PATENT DOCUMENTS

| | | | | |
|---|---|---|---|---|
| 6,403,025 | B2 * | 6/2002 | Goransson | B22F 3/03 419/38 |
| 9,132,480 | B2 * | 9/2015 | Cripps | B22F 3/03 |
| 2002/0102318 | A1 | 8/2002 | Sugaya et al. | |
| 2009/0120155 | A1 | 5/2009 | Minamoto et al. | |

FOREIGN PATENT DOCUMENTS

| | | | |
|---|---|---|---|
| JP | 2001-138002 | A | 5/2001 |
| JP | 2002-129201 | A | 5/2002 |
| JP | 2005-342744 | A | 12/2005 |
| JP | 2006-305626 | A | 11/2006 |
| JP | 2006-334630 | A | 12/2006 |
| JP | 2012-136760 | A | 7/2012 |

* cited by examiner shrinkage fitting ratio: 0.15%

STEPPED DIE

TECHNICAL FIELD

The present invention relates to a stepped die. To be more specific, the present invention relates to a stepped die where an outer ring is fitted on an outer periphery of an inner ring by shrinkage fitting.

BACKGROUND ART

In powder molding, there may be a case where a mold referred to as a stepped die is used in molding an outer peripheral side of a part 31 having a step 30 on an outer periphery as shown in FIG. 8, for example. FIG. 9 is a plan view of one example of such a stepped die 21, and FIG. 10 is a cross-sectional view of the stepped die 21.

The stepped die 21 includes an inner ring 22 having a cylindrical shape, and an outer ring 23 having a cylindrical shape which is fitted on an outer periphery of the inner ring 22 by shrinkage fitting, and a recessed portion 24 for molding is formed on an inner side of the inner ring 22. The recessed portion 24 has a stepped portion 25 which corresponds to the step 30 of the part 31. As shown in FIG. 9, the stepped portion 25 has a rectangular shape as viewed in a plan view. A flange portion 27 which engages with a die plate 26 is formed on an outer periphery of the outer ring 23.

In molding the part 31 using the above-mentioned stepped die 21, after molding, the part 31 is removed from the stepped die 21 in such a manner that the stepped die 21 is lowered together with the die plate 26 so that the part 31 is pushed upward relative to the stepped die 21 by a lower punch 28 in a fixed state. Accordingly, a support which supports the stepped die 21 cannot be disposed in a space S below the stepped die 21 since the support becomes an obstacle against lowering of the stepped die 21. In view of the above, the compression of powder is performed using an upper surface 28*a* of the lower punch 28 and an upper surface 25*a* of the stepped portion 25 as pressure receiving surfaces in a state where only a flange portion 27 formed on an outer periphery of the stepped die 21 is supported and a lower surface of the stepped die 21 is not supported.

However, in such a pressure applying method, a pressure applied to the stepped portion 25 is received by an edge portion or a corner portion of the stepped portion 25 and hence, a bending stress is concentrated on the corner portion thus giving rise to a possibility that a crack C occurs (see FIG. 11). There is a possibility that the occurrence of the crack C not only leads to a rupture of the stepped die 21, but also influences accuracy of a finished part 31.

In view of the above, to prevent the occurrence of a crack by alleviating the stress concentration at the corner portion of the stepped portion of the stepped die, there has been proposed a method where a ring is mounted on an outer periphery of a die portion on which a bending stress acts by tight fitting (see patent literature 1).

CITATION LIST

Patent Literature

Patent Literature 1: Japanese Unexamined Utility Model Publication No. 3-59329

SUMMARY OF INVENTION

Technical Problem

However, in the method described in patent literature 1, it is necessary to prepare an additional part referred to as the ring besides the die, and the method also requires a step of fitting the ring on the outer periphery of the die by tight fitting.

In view of the above, it may be considered that a compressive residual stress is generated around a corner portion of a stepped portion by setting a slightly larger shrinkage fitting ratio or shrinkage fitting amount at the time of fitting an outer ring on an outer periphery of an inner ring by shrinkage fitting.

However, even when a shrinkage fitting ratio is merely increased, a residual compressive stress which is sufficient for coping with a bending stress generated in the corner portion of the stepped portion of the inner ring at the time of pressure molding cannot be obtained and hence, there is a case where a crack occurs. Further, the method originally has a drawback that, at the time of shrinkage fitting, an excessively large stress is generated in a portion of the stepped portion of the inner ring other than the corner portion thus leading to the occurrence of a crack.

The present invention has been made in view of such circumstances, and it is an objective of the present invention to provide a stepped die which can prevent the occurrence of a crack in a corner portion of a stepped portion without increasing the number of parts and the number of man-hours.

Solution to Problem

A stepped die according to the present invention is a stepped die for powder molding of metal powder, which includes an inner ring made of a sintered hard alloy and having a cylindrical shape, and an outer ring having a cylindrical shape which is fitted on an outer periphery of the inner ring by shrinkage fitting, in which a recessed portion for molding which has a stepped portion is formed on an inner side of the inner ring, wherein a flange portion which is engaged with a die plate is formed on an outer periphery of the outer ring, wherein only the flange portion of the stepped die is supported by the die plate while a lower surface of the stepped die is not supported by other member, and wherein a shrinkage fitting ratio of the outer ring to the inner ring is set to a value which falls within a range of from 0.12% to 0.25%.

In the stepped die according to the present invention, a shrinkage fitting ratio of the outer ring to the inner ring is set to a value which falls within a range of from 0.12% to 0.25% and hence, an appropriate compressive stress can be applied to a corner portion of the stepped portion of the recessed portion for molding whereby it is possible to prevent the occurrence of a crack in the corner portion which may be caused by a bending stress concentrated on the corner portion at the time of pressure molding.

Advantageous Effects of Invention

According to the stepped die of the present invention, it is possible to prevent the occurrence of a crack in a corner portion of a stepped portion without increasing the number of parts and the number of man-hours.

DESCRIPTION OF EMBODIMENTS

A stepped die of the present invention includes an inner ring made of a sintered hard alloy and having a cylindrical shape, and an outer ring having a annular shape which is fitted on an outer periphery of the inner ring by shrinkage fitting, and a recessed portion for molding which has a stepped portion is formed on an inner side of the inner ring. A flange portion which is engaged with a die plate is formed on an outer periphery of the outer ring. Only the flange portion of the stepped die is supported by the die plate while a lower surface of the stepped die is not supported by other member. A shrinkage fitting ratio of the outer ring to the inner ring is set to a value which falls within a range of from 0.12% to 0.25%.

It is preferable that a ratio between an outer diameter of the inner ring and a diameter of a maximum imaginary circle which is an imaginary circle having a center on a central axis of the inner ring and passes a corner portion of the stepped portion remotest from the center in a radially outward direction be set to 1.4 or more. In this case, by imparting a predetermined wall thickness to the inner ring, a resistance of the inner ring against a residual compressive stress applied to the inner ring due to shrinkage fitting of the outer ring can be increased.

Further, it is preferable that the ratio be set to 2.0 or less. In this case, by restricting a wall thickness of the inner ring to a predetermined amount or less, the large-sizing of the inner ring and eventually the large-sizing of the stepped die can be suppressed while maintaining a resistance of the inner ring against a residual compressive stress.

It is preferable that a wall thickness which is the difference between an outer diameter of the inner ring and the diameter of the maximum imaginary circle which is the imaginary circle having the center on the central axis of the inner ring and passes the corner portion of the stepped portion remotest from the center in a radially outward direction be set to 5 mm or more. In this case, by imparting a predetermined wall thickness to the inner ring, a resistance of the inner ring against a residual compressive stress applied to the inner ring due to shrinkage fitting of the outer ring can be increased.

By employing a sintered hard alloy as a material of the inner ring, compressive strength and fatigue strength required for the inner ring can be ensured. A material of the outer ring may be hardened steel. Further, it is preferable that a shrinkage fitting ratio of the outer ring to the inner ring is set to a value which falls within a range of from 0.15% to 0.20%.

Figure 1:
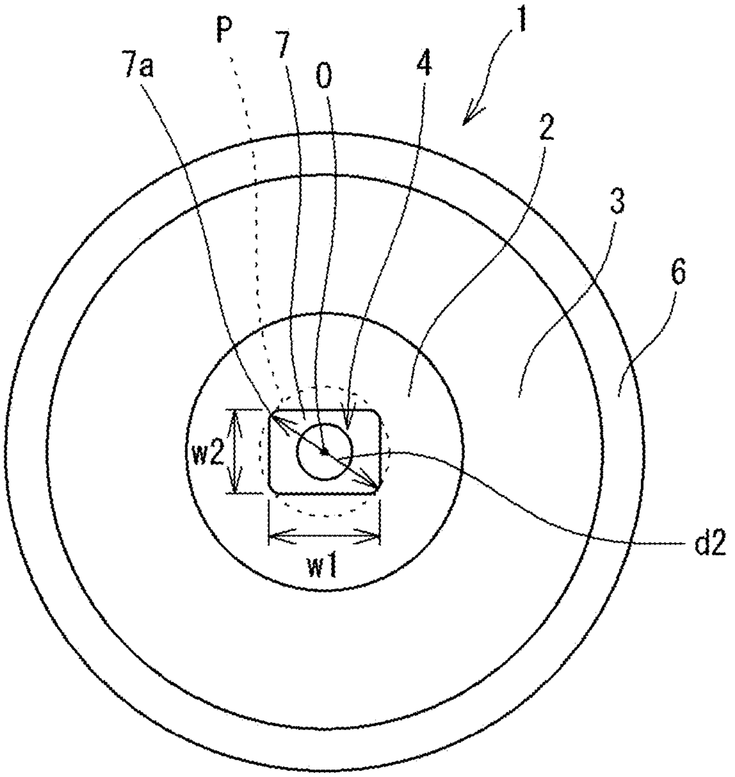
FIG. 1 is a plan view of a stepped die according to one embodiment of the present invention.
Figure 2:
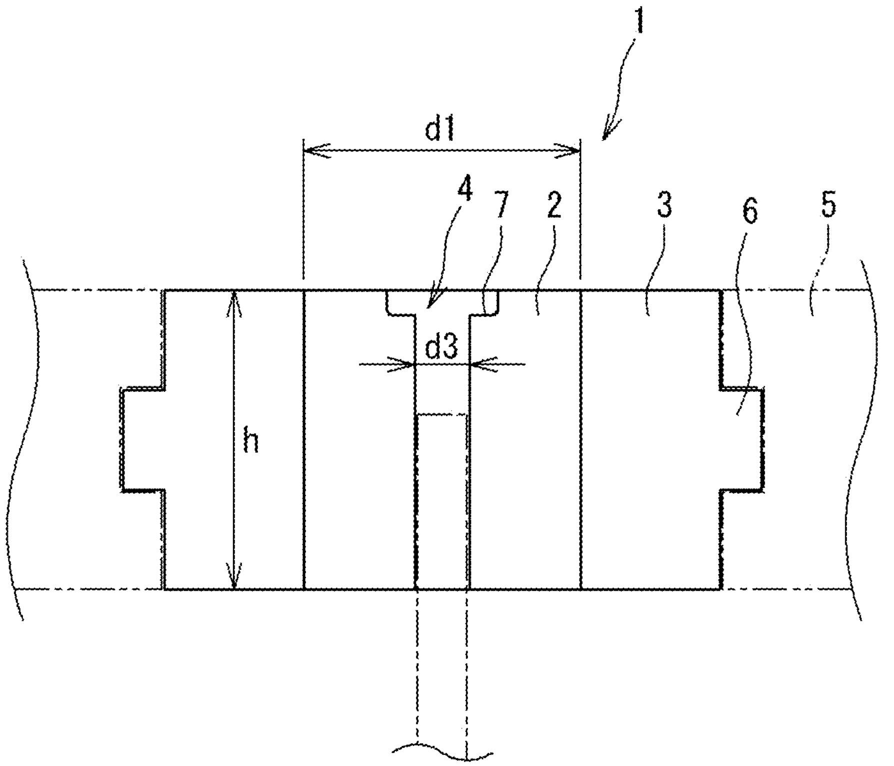
FIG. 2 is a cross-sectional view of the stepped die shown in FIG. 1.

Hereinafter, a stepped die according to an embodiment of the present invention is described in detail with reference to attached drawings. FIG. 1 is a plan view of a stepped die 1 according to one embodiment of the present invention, and FIG. 2 is a cross-sectional view of the stepped die 1 shown in FIG. 1.

The stepped die 1 according to the present embodiment is a die used in manufacturing a green compact formed by compressing powder for metallurgy. The stepped die 1 includes an inner ring 2, and an outer ring 3 which is fitted on an outer periphery of the inner ring 2 by shrinkage fitting. A recessed portion 4 for molding is formed on an inner side of the inner ring 2.

The inner ring 2 has a cylindrical shape, and is manufactured using a sintered hard alloy such as a WC—Co alloy or a WC—TiC—Co alloy, for example. The outer ring 3 also has a cylindrical shape, and can be manufactured using general hardened steel. A flange portion 6 which is engaged with a die plate 5 is formed on an outer periphery of the outer ring 3 over the whole circumference.

Figure 8:
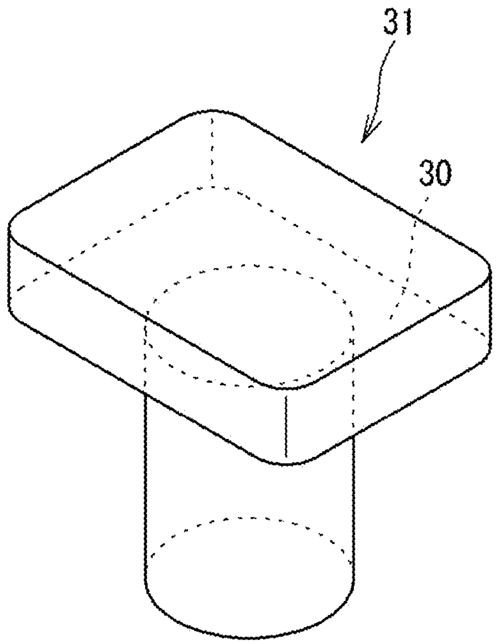
FIG. 8 is a perspective view showing one example of a powder molded product which has a stepped portion on an outer side thereof.
Figure 9:
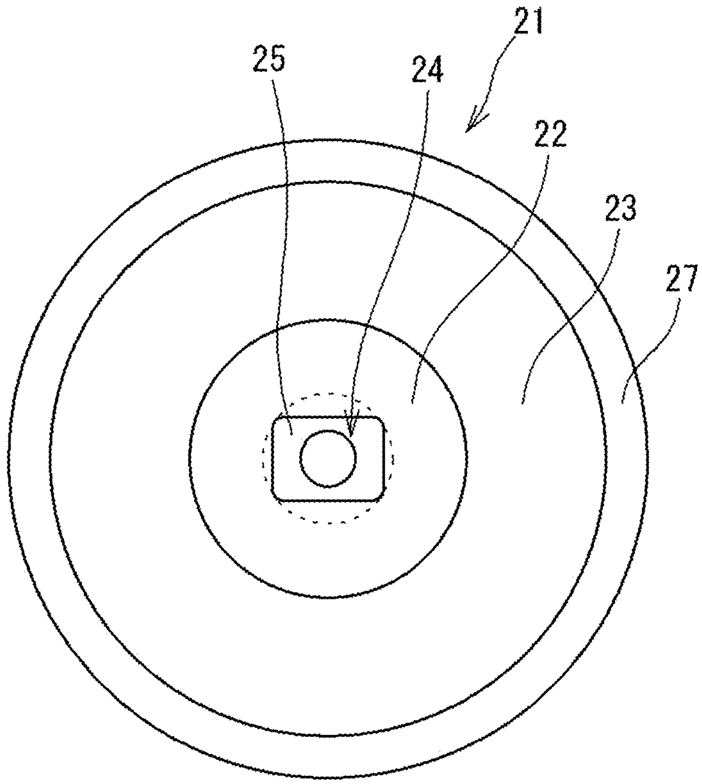
FIG. 9 is a plan view showing one example of a stepped die.
Figure 10:
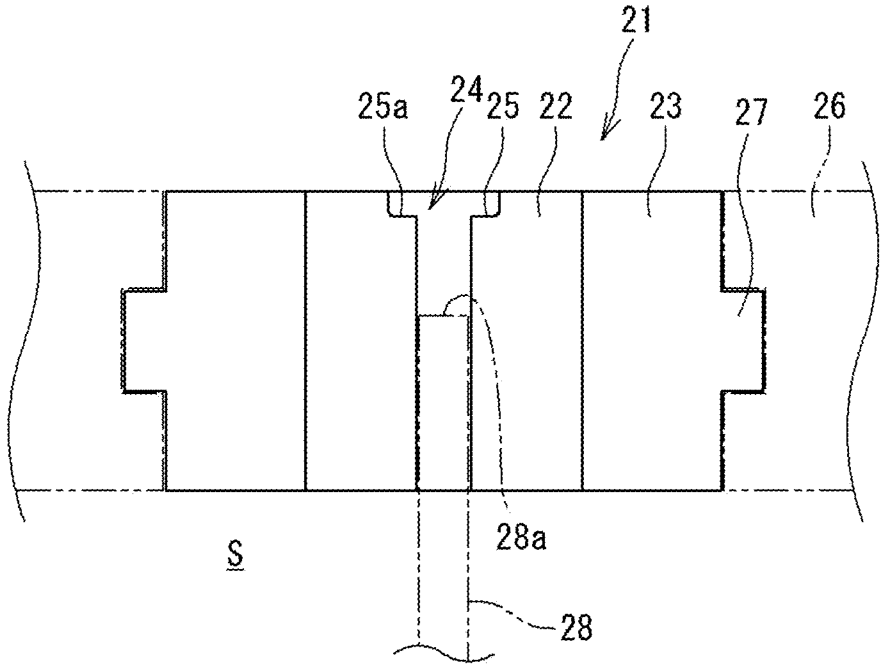
FIG. 10 is a cross-sectional view of the stepped die shown in FIG. 9.
Figure 11:
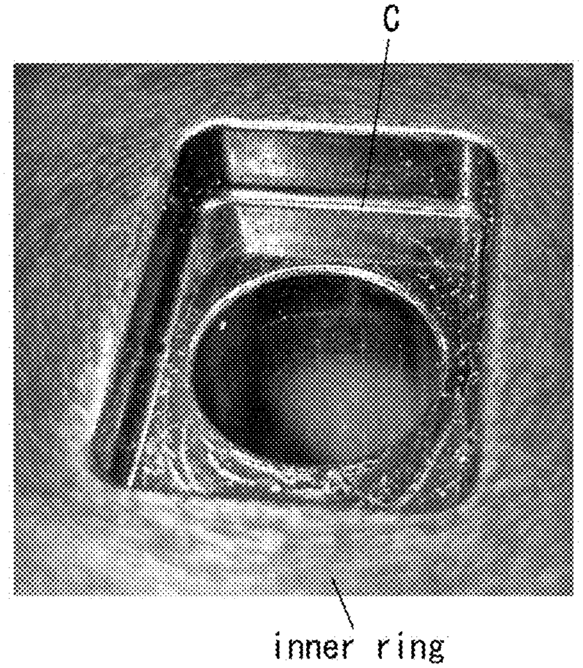
FIG. 11 is a photograph showing a crack generated in a corner portion of a stepped portion.

The recessed portion 4 has a rectangular shape as viewed in a plan view on an upper surface side (upper side in FIG. 2) of the inner ring 2, and has a circular shape as viewed in a plan view on a lower surface side (lower side in FIG. 2) of the inner ring 2. A stepped portion 7 is formed on a boundary portion between an upper recessed portion having a rectangular shape as viewed in a plan view and a lower recessed portion having a circular shape as viewed in a plan view. The stepped portion 7 is a portion corresponding to a step of a molded product (see FIG. 8) which is formed by molding using the stepped die 1.

In this embodiment, an outer diameter of the inner ring 2 and an inner diameter of the outer ring 3 are set such that a shrinkage fitting ratio or a shrinkage fitting amount expressed by the following formula (1) (hereinafter, represented as “shrinkage fitting ratio”) takes a value which falls within a range of from 0.12% to 0.25%.

$$\text{Shrinkage fitting ratio } (\%)=\{1-(\text{inner diameter of outer ring}/\text{outer diameter of inner ring})\}\times 100 \quad (1)$$

When a shrinkage fitting ratio (%) is less than 0.12%, there is a possibility that a residual compressive stress is insufficient so that a crack occurs at the time of molding. On the other hand, when a shrinkage fitting ratio (%) is more than 0.25%, there is a possibility that a crack occurs at the time of shrinkage fitting. From a viewpoint of surely preventing the occurrence of a crack and also suppressing the large-sizing of the inner ring, it is preferable that a shrinkage fitting ratio (%) be set to a value which falls within a range of from 0.15% to 0.20%.

In this embodiment, a ratio between an outer diameter d1 of the inner ring 2 and a diameter d2 of an imaginary circle P which is an imaginary circle having a center on a central axis O of the inner ring 2 and passes a corner portion **7*a* of the stepped portion 7 remotest from the center O in a radially outward direction (hereinafter, the imaginary circle is also referred to as “maximum imaginary circle”) is set to 1.4 or more. Hereinafter, this ratio is also referred to as “inner ring ratio”. When the inner ring ratio is less than 1.4, there is a possibility that a crack occurs in a thin wall thickness portion of the inner ring 2 due to a residual compressive stress generated in the inner ring 2 brought about by fitting the outer ring 3 on the outer periphery of the inner ring 2 by shrinkage fitting. On the other hand, when the inner ring ratio is set to 1.4 or more, there is no possibility that the above-mentioned drawback occurs. However, when the inner ring ratio is excessively large, the inner ring 2 and eventually the stepped die 1** becomes large-sized and hence, it is preferable that the inner ring ratio be set to 2.0 or less.

Further, based on a viewpoint substantially equal to the viewpoint taken with respect to the inner ring ratio described previously, in this embodiment, a wall thickness which is a value obtained by dividing a difference between the outer diameter d1 of the inner ring 2 and a diameter d2 of the previously-mentioned maximum imaginary circle by 2 is set to 5 mm or more. When the wall thickness is less than 5 mm, there is a possibility that a crack occurs in a thin wall thickness portion of the inner ring 2 due to a residual compressive stress generated in the inner ring 2 brought about by fitting the outer ring 3 on the outer periphery of the inner ring 2 by shrinkage fitting. On the other hand, when the wall thickness is equal to or more than 5 mm, there is no possibility that the above-mentioned drawback occurs. However, when the wall thickness is excessively large, the inner ring 2 and eventually the stepped die 1 becomes large-sized and hence, it is preferable that the wall thickness be set to 40 mm or less.

Test Example 1

Green compacts were prepared by pressure molding such that metal powder was filled in the recessed portion for molding and was press-molded at a molding pressure of 10 t/cm$^2$ while variously changing, as described in Table 1, a diameter of the inner ring, an inner ring ratio, a wall thickness (a value obtained by dividing a difference between an outer diameter of the inner ring and an diameter of the maximum imaginary circle described previously by 2), and a shrinkage fitting ratio (see the formula (1)) in a stepped die having the configuration and shape shown in FIG. 1 and FIG. 2.

A height h of the stepped die (see FIG. 2) was set to 40 mm. A length w1 of a long side of the rectangular portion of the recessed portion for molding was set to 21 mm, a length w2 of a short side of the rectangular portion was set to 16 mm, and a diameter d3 of a circular columnar portion of the recessed portion was set to 10 mm. Further, a material of the inner ring was a WC—Co based sintered hard alloy, and a material of the outer ring was hot die steel.

TABLE 1

Equivalent stress σaeq of stepped corner R portion [MPa]

| | | | | | | | | |
|---|---|---|---|---|---|---|---|---|
| Inner ring diameter | | φ70 | φ60 | φ50 | φ45 | φ40 | φ35 | φ32 |
| Inner ring ratio | | 2.8 | 2.4 | 2.0 | 1.8 | 1.6 | 1.4 | 1.3 |
| Wall thickness [mm] | | 23 | 18 | 13 | 10 | 8 | 5 | 4 |
| Shrinkage | 0.00 | 765 | 776 | 790 | 799 | 807 | 817 | 823 |
| fitting | 0.10 | 681 | 679 | 664 | 654 | 644 | 628 | 616 |
| ratio [%] | 0.12 | 672 | 664 | 652 | 641 | 629 | 610 | 599 |
| | 0.15 | 666 | 663 | 651 | 639 | 629 | 608 | 591 |
| | 0.20 | 659 | 658 | 653 | 642 | 629 | 607 | 594 |
| | 0.25 | 659 | 658 | 651 | 643 | 632 | 612 | 601 |
| | 0.35 | 664 | 661 | 654 | 646 | 640 | 633 | 627 |
| | 0.50 | 693 | 693 | 695 | 696 | 697 | 697 | 697 |

* Molding pressure: 10 t/cm$^2$

Figure 3:
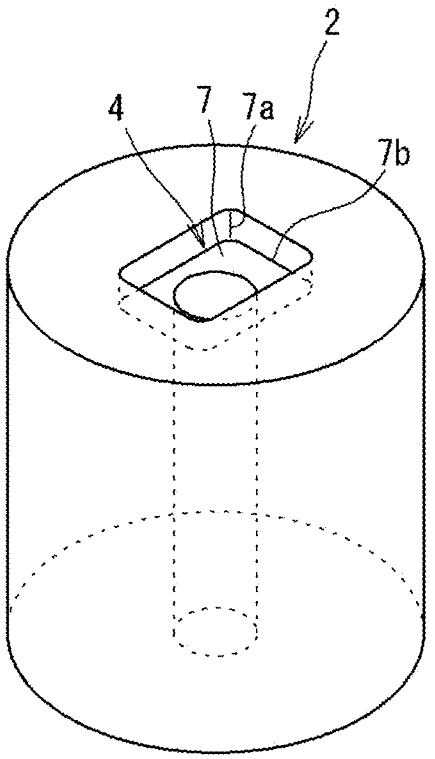
FIG. 3 is a perspective explanatory view of an inner ring of the stepped die shown in FIG. 1.

Table 1 shows an equivalent stress σaeq of the stepped corner R portion when the diameter, the inner ring ratio, the wall thickness, and the shrinkage fitting ratio of each inner ring were variously changed. As shown in FIG. 3, "stepped corner R portion" means a short-side edge portion 7*b* of the stepped portion 7 having a rectangular shape as viewed in a plan view, and "side-surface corner portion" in Tables 3 and 4 described later means a boundary portion between two neighboring surfaces out of inner surfaces of the inner ring which face the recessed portion 4 having a rectangular shape as viewed in a plan view, and is the same portion as the corner portion 7*a* described previously.

The equivalent stress σaeq is a value calculated by the following formula (2).

$$\sigma aeq=\sigma s/(1-\sigma m/\sigma_B) \quad (2)$$

In the formula (2), σa is an amplitude of stress generated at the time of molding metal powder by pressure molding, and σm indicates an average stress. GB is a tensile strength which is a value unique to a material. In the present test example 1, a WC—Co sintered hard alloy was used as a material of the inner ring so that the value of $\sigma_B$ is 1600 MPa.

Table 2 shows a strength ratio (fatigue strength/σaeq) calculated based on the equivalent stress σaeq shown in Table 1 and a fatigue strength which is a value unique to a material. In the present test example 1, a WC—Co sintered hard alloy was used as a material of the inner ring so that the fatigue strength was 700 MPa.

TABLE 2

Strength ratio of stepped corner R portion (fatigue strength of material ÷ σaeq)

| | | | | | | | | |
|---|---|---|---|---|---|---|---|---|
| Inner ring diameter | | φ70 | φ60 | φ50 | φ45 | φ40 | φ35 | φ32 |
| Inner ring ratio | | 2.8 | 2.4 | 2.0 | 1.8 | 1.6 | 1.4 | 1.3 |
| Wall thickness [mm] | | 23 | 18 | 13 | 10 | 8 | 5 | 4 |
| Shrinkage | 0.00 | 0.92 | 0.90 | 0.89 | 0.88 | 0.87 | 0.86 | 0.85 |
| fitting | 0.10 | 1.03 | 1.03 | 1.05 | 1.07 | 1.09 | 1.12 | 1.14 |
| ratio [%] | 0.12 | 1.04 | 1.05 | 1.07 | 1.09 | 1.11 | 1.15 | 1.17 |
| | 0.15 | 1.05 | 1.06 | 1.07 | 1.10 | 1.11 | 1.15 | 1.18 |
| | 0.20 | 1.06 | 1.06 | 1.07 | 1.09 | 1.11 | 1.15 | 1.18 |
| | 0.25 | 1.06 | 1.06 | 1.07 | 1.09 | 1.11 | 1.14 | 1.16 |
| | 0.35 | 1.05 | 1.06 | 1.07 | 1.08 | 1.09 | 1.11 | 1.12 |
| | 0.50 | 1.01 | 1.01 | 1.01 | 1.01 | 1.00 | 1.00 | 1.00 |

*Molding pressure: 10 t/cm$^2$

Figure 4:
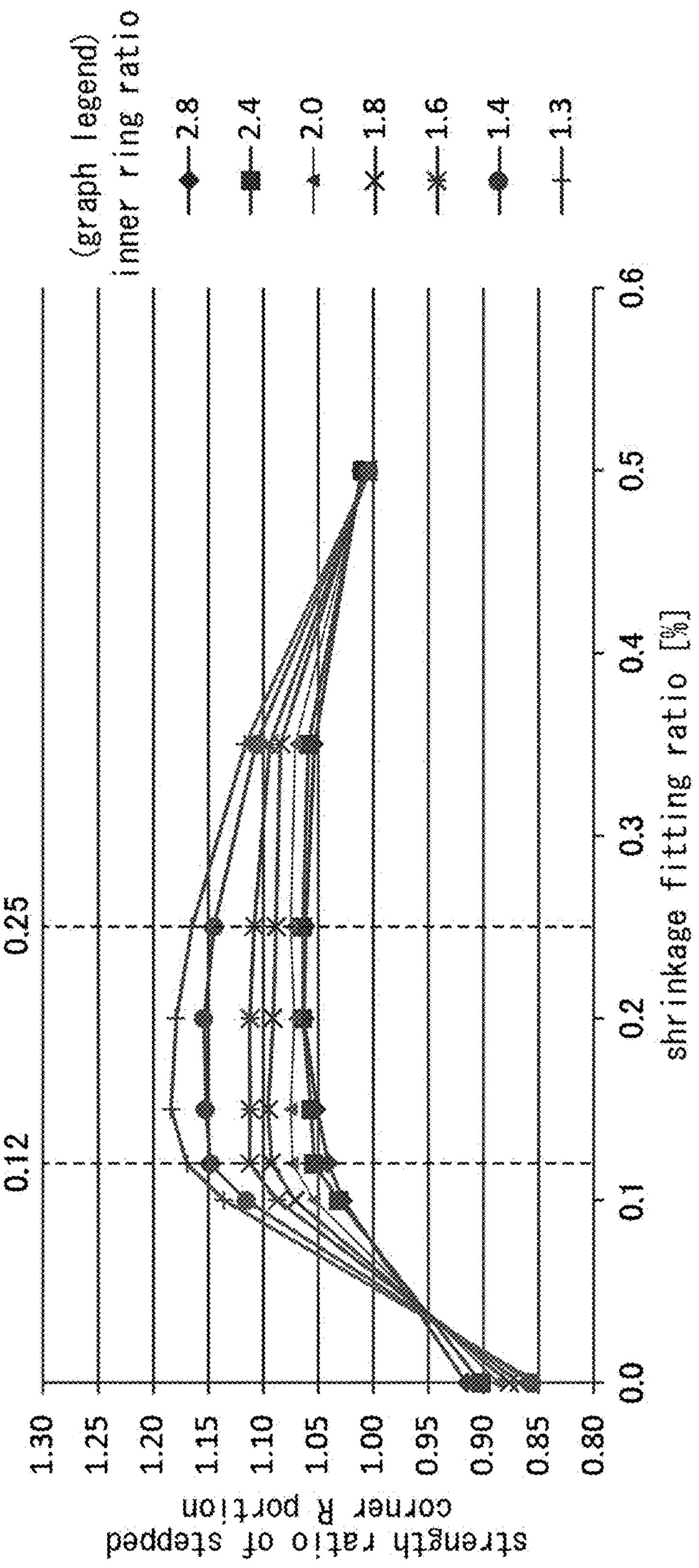
FIG. 4 is a graph showing a relationship between a strength ratio of a stepped corner R portion and a shrinkage fitting ratio.
Figure 5:
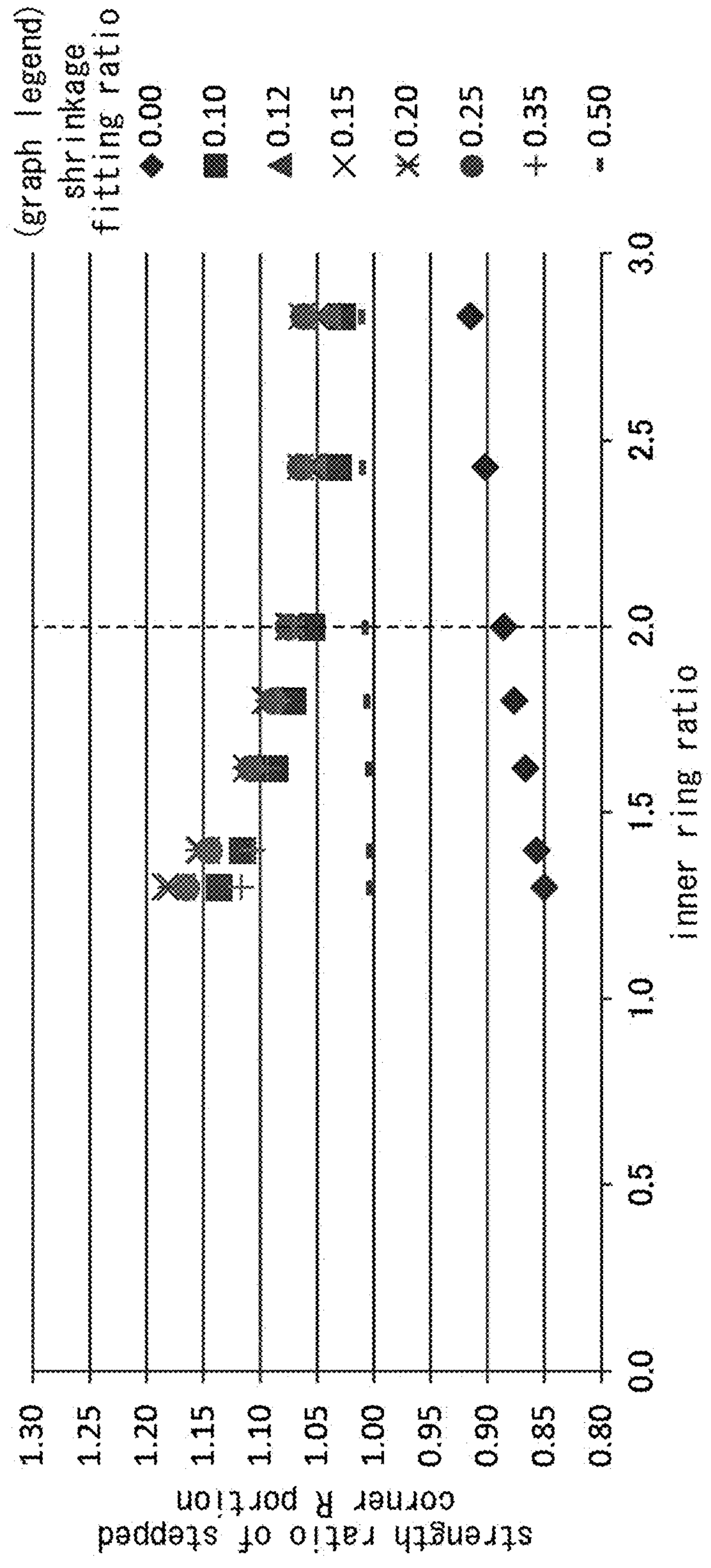
FIG. 5 is a graph showing a relationship between a strength ratio of the stepped corner R portion and an inner ring ratio.

FIG. 4 shows the result shown in Table 2 in a graphical form for respective inner ring ratios, and FIG. 5 shows the result in Table 2 in a graphical form for respective shrinkage fitting ratios. In FIG. 4, a strength ratio of the stepped corner R portion is taken on an axis of ordinates, and a shrinkage fitting ratio (%) is taken on an axis of abscissas. Further, in FIG. 5, a strength ratio of the stepped corner R portion is taken on an axis of ordinates, and an inner ring ratio is taken on an axis of abscissas.

From FIG. 4, it is understood that a strength ratio of the stepped corner R portion is substantially fixed in a stable manner when a shrinkage fitting ratio (%) falls within a range of from 0.12 to 0.25. Also from FIG. 5, it is understood that a strength ratio of the stepped corner R portion takes a substantially fixed value when the inner ring ratio exceeds 2.0.

In the test example 1, it was confirmed (visually recognized) that a crack was generated in the sample (strength ratio: 1.06) where a shrinkage fitting ratio was set to 0.35% and an inner ring ratio was set to 2.4. On the other hand, a crack was not confirmed in the sample (strength ratio: 1.11) where a shrinkage fitting ratio was set to 0.15%, and an inner ring ratio was set to 1.6.

Test Example 2

A compressive stress which was generated in a side surface corner portion of the stepped portion of the inner ring (the portion indicated by "7*a*" in FIG. 3 as descried previously) was obtained while variously changing, as described in Table 3, a diameter of the inner ring, an inner ring ratio, a wall thickness (a value obtained by dividing a difference between an outer diameter of the inner ring and a diameter of the maximum imaginary circle described previously by 2), and a shrinkage fitting ratio (see the formula (1)) in a stepped die having the configuration and shape shown in FIG. 1 and FIG. 2.

A height h of the stepped die (see FIG. 2) was set to 40 mm. A length w1 of a long side of the rectangular portion of the recessed portion for molding was set to 21 mm, a length w2 of a short side of the rectangular portion was set to 16 mm, and a diameter d3 of a circular columnar portion of the recessed portion was set to 10 mm. A material of the inner ring was a WC—Co based sintered hard alloy, and a material of the outer ring was hot die steel.

TABLE 3

| Compressive stress of side-surface corner portion [MPa] | | | | | | | | | | |
|---|---|---|---|---|---|---|---|---|---|---|
| Inner ring diameter | | φ70 | φ60 | φ50 | φ45 | φ40 | φ37 | φ35 | φ32 | φ30 |
| Inner ring ratio | | 2.8 | 2.4 | 2.0 | 1.8 | 1.6 | 1.5 | 1.4 | 1.3 | 1.2 |
| Wall thickness [mm] | | 23 | 18 | 13 | 10 | 8 | 6 | 5 | 4 | 3 |
| Shrinkage fitting ratio [%] | 0.00 | 0 | 0 | 0 | 0 | 0 | 0 | 0 | 0 | 0 |
| | 0.15 | −501 | −541 | −571 | −601 | −642 | −676 | −744 | −918 | −1346 |
| | 0.20 | −639 | −723 | −751 | −793 | −868 | −901 | −992 | −1224 | −1794 |
| | 0.35 | −1142 | −1179 | −1330 | −1387 | −1501 | −1576 | −1736 | −2141 | −3140 |
| | 0.50 | −1612 | −1681 | −1832 | −1982 | −2145 | −2252 | −2480 | −3059 | −4486 |

Table 4 shows a compressive strength ratio (compressive strength/generated compressive stress) calculated based on generated compressive stress shown in Table 3 and a compressive strength which is a unique value that a material has. In the present test example 2, a WC—Co sintered hard alloy was used as a material of the inner ring so that the compressive strength was 4000 MPa.

TABLE 4

| Compressive strength ratio (compressive strength ÷ generated compressive stress) | | | | | | | | | | |
|---|---|---|---|---|---|---|---|---|---|---|
| Inner ring diameter | | φ70 | φ60 | φ50 | φ45 | φ40 | φ37 | φ35 | φ32 | φ30 |
| Inner ring ratio | | 2.8 | 2.4 | 2.0 | 1.8 | 1.6 | 1.5 | 1.4 | 1.3 | 1.2 |
| Wall thickness [mm] | | 23 | 18 | 13 | 10 | 8 | 6 | 5 | 4 | 3 |
| Shrinkage fitting ratio [%] | 0.00 | — | — | — | — | — | — | — | — | — |
| | 0.15 | 8.0 | 7.4 | 7.0 | 6.7 | 6.2 | 5.9 | 5.4 | 4.4 | 3.0 |
| | 0.20 | 6.3 | 5.5 | 5.3 | 5.0 | 4.6 | 4.4 | 4.0 | 3.3 | 2.2 |
| | 0.35 | 3.5 | 3.4 | 3.0 | 2.9 | 2.7 | 2.5 | 2.3 | 1.9 | 1.3 |
| | 0.50 | 2.5 | 2.4 | 2.2 | 2.0 | 1.9 | 1.8 | 1.6 | 1.3 | 0.9 |

Figure 6:
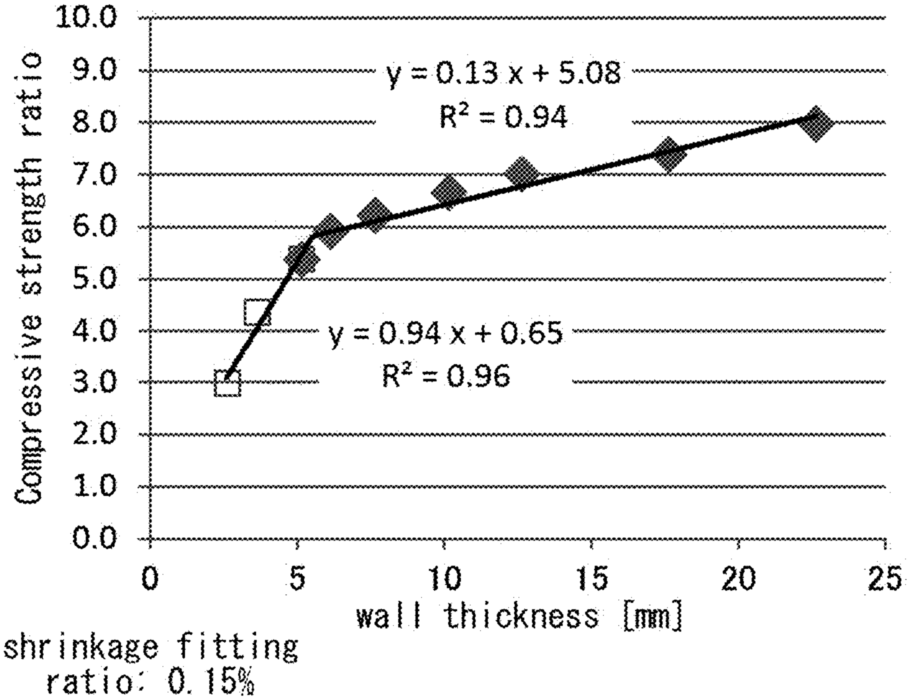
FIG. 6 is a graph showing a relationship between a compressive strength ratio and a wall thickness.
Figure 7:
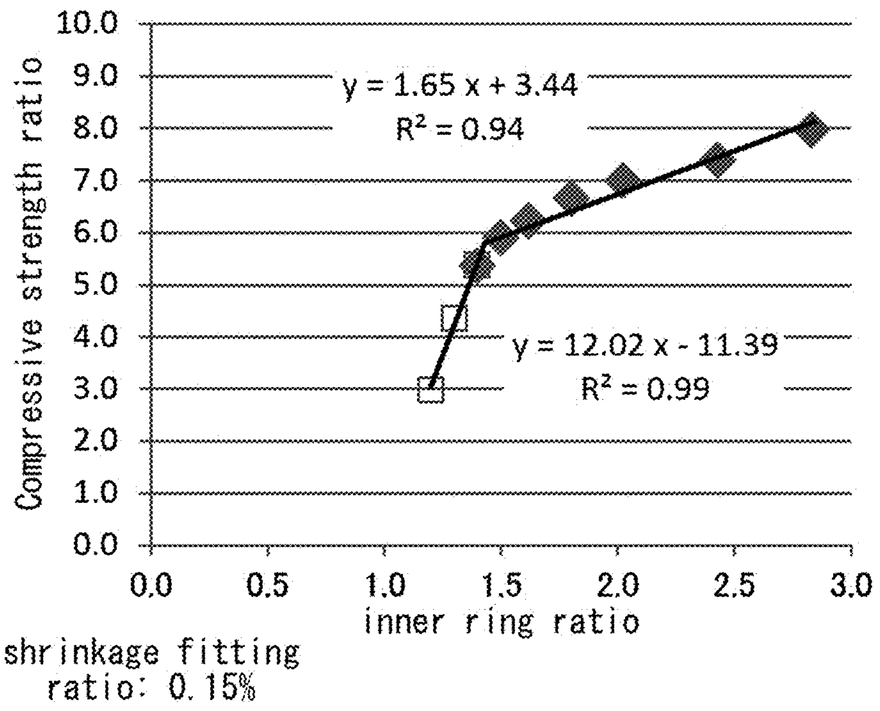
FIG. 7 is a graph showing a relationship between a compressive strength ratio and an inner ring ratio.

FIG. 6 shows the result in Table 4 in a graphical form with respect to the case where a shrinkage fitting ratio (%) was set to 0.15%. In FIG. 6, a compressive strength ratio is taken on an axis of ordinates, and a wall thickness (mm) is taken on an axis of abscissas. FIG. 7 also shows the result in Table 4 in a graphical form with respect to the same case. In FIG. 7, a compressive strength ratio is taken on an axis of ordinates, and an inner ring ratio is taken on an axis of abscissas.

From FIG. 6, it is understood that, with a wall thickness in the vicinity of 5 mm set as a boundary value, the way that a compressive strength ratio changes largely differed between the case where the wall thickness is smaller than the boundary value and the case where the wall thickness is larger than the boundary value. To be more specific, a relationship between a compressive strength ratio and a wall thickness in three test examples where the wall thickness is set equal to or less than 5 mm can be expressed by $y=0.94x+0.65$ ($R^2=0.96$), and a relationship between a compressive strength ratio and a wall thickness in seven test examples where the wall thickness is set equal to or more than 5 mm can be expressed by $y=0.13x+5.08$ ($R^2=0.94$). It is understood that an inclination of a regression line largely changes above and below "5 mm" which functions as a maximum value.

From FIG. 7, it is understood that, with an inner ring ratio in the vicinity of 1.4 set as a boundary value, the way that a compressive strength ratio changes largely differed between the case where the inner ring ratio is smaller than the boundary value and the case where the inner ring ratio is larger than the boundary value. To be more specific, a relationship between a compressive strength ratio and an inner ring ratio in three test examples where the inner ring ratio is set equal to or less than 1.4 can be expressed by $y=12.02x+11.39$ ($R^2=0.99$), and a relationship between a compressive strength ratio and an inner ring ratio in seven test examples where the inner ring ratio is set equal to or more than 1.4 can be expressed by $y=1.65x+3.44$ ($R^2=0.94$). It is understood that an inclination of a regression line largely changes above and below "1.4" which functions as a maximum value.

From the result of the test example 1 and the result of the test example 2, it is understood that it is preferable to set a shrinkage fitting ratio (%) to a value which falls within a range of from 0.12 to 0.25% since a substantially fixed strength ratio of the stepped corner R portion can be obtained. It is also understood that it is preferable to set an inner ring ratio to 1.4 or more. It is also understood that it is preferable to set a wall thickness to 5 mm or more. On the other hand, it is understood that it is preferable to set an upper limit value of an inner ring ratio to 2.0 or less.

[Other Modifications]

It should be construed that the embodiments are disclosed merely in an exemplifying purpose and are not limitative in any aspects. The scope of the present invention should not be determined by the meanings disclosed in the embodiments, and the present invention intends to embrace all modifications which are described in Claims and fall within the meaning and the scope equivalent to the meaning and the scope of Claims.

For example, in the above-mentioned embodiment, the recessed portion for molding has a rectangular shape as viewed in a plan view. However, the shape and the size of the recessed portion can be suitably selected corresponding to a molded product and, for example, the recessed portion may have a circular shape or a polygonal shape as viewed in a plan view.

REFERENCE SIGNS LIST

1: STEPPED DIE
2: INNER RING
3: OUTER RING
4: RECESSED PORTION
5: DIE PLATE
6: FLANGE PORTION
7: STEPPED PORTION
7A: CORNER PORTION
7B: STEPPED CORNER R PORTION
21: STEPPED DIE
22: INNER RING
23: OUTER RING
24: RECESSED PORTION
25: STEPPED PORTION
26: DIE PLATE
27: FLANGE PORTION
28: LOWER PUNCH
30: STEP
31: PART
O: CENTRAL AXIS
C: CRACK
P: IMAGINARY CIRCLE
S: LOWER SPACE
d1: OUTER DIAMETER OF INNER RING
d2: DIAMETER OF MAXIMUM IMAGINARY CIRCLE
d3: DIAMETER OF RECESSED PORTION
w1: LONG SIDE OF RECESSED PORTION
w2: SHORT SIDE OF RECESSED PORTION
h: HEIGHT OF STEPPED DIE

The invention claimed is:

1. A stepped die for powder molding of metal powder comprising:

an inner ring made of a sintered hard alloy and having a cylindrical shape, and an outer ring having a cylindrical shape which is fitted on an outer periphery of the inner ring by shrinkage fitting, in which a recessed portion for molding which has a stepped portion is formed on an inner side of the inner ring, wherein a flange portion which is engaged with a die plate is formed on an outer periphery of the outer ring, wherein only the flange portion of the stepped die is supported by the die plate while a lower surface of the stepped die is not supported by other member, and wherein a shrinkage fitting ratio of the outer ring to the inner ring is set to a value which falls within a range of from 0.12% to 0.25%.

2. The stepped die according to claim 1, wherein a ratio between an outer diameter of the inner ring and a diameter of a maximum imaginary circle which is an imaginary circle having a center on a central axis of the inner ring and passes a corner portion of the stepped portion remotest from the center in a radially outward direction is set to 1.4 or more.

3. The stepped die according to claim 2, wherein the ratio is set to 2.0 or less.

4. The stepped die according to claim 1, wherein a wall thickness which is difference between an outer diameter of the inner ring and a diameter of a maximum imaginary circle which is an imaginary circle having a center on a central axis of the inner ring and passes a corner portion of the stepped portion remotest from the center in a radially outward direction is set to 5 mm or more.

5. The stepped die according to any one of claims 1 to 4, wherein a material of the inner ring is a sintered hard alloy, and a material of the outer ring is hardened steel.

6. The stepped die according to any one of claims 1 to 5, wherein the shrinkage fitting ratio of the outer ring to the inner ring is set to a value which falls within a range from 0.15% to 0.20%.

* * * * *